Nov. 19, 1963   J. M. SPINKS   3,111,621
ALTERNATING VOLTAGE REGULATORS INCORPORATING
MAGNETIC AMPLIFIERS
Filed Aug. 11, 1960
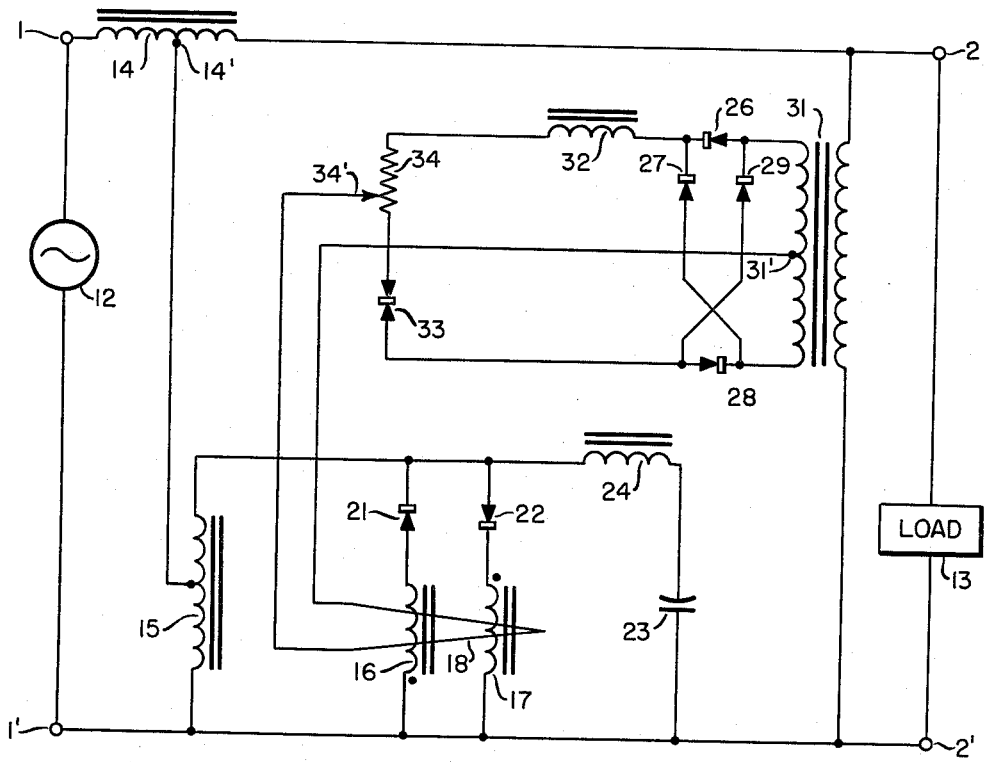
INVENTOR.
JAMES M. SPINKS
BY Kenway, Jenney
Witter & Hildreth
ATTORNEYS

United States Patent Office 3,111,621
Patented Nov. 19, 1963

3,111,621
ALTERNATING VOLTAGE REGULATORS INCORPORATING MAGNETIC AMPLIFIERS
James Merritt Spinks, Newton, Mass., assignor to Atlas Engineering Company, Inc., Roxbury, Mass., a corporation of Massachusetts
Filed Aug. 11, 1960, Ser. No. 48,884
4 Claims. (Cl. 323—76)

This invention relates generally to voltage regulating apparatus and more particularly it is concerned with alternating voltage regulators incorporating magnetic amplifiers.

Closed loop voltage regulators for alternating current (A.C.) sources, that is regulators which employ magnetic cores with controllable saturation levels, offer the advantage of being sensitive to load as well as voltage variations. Also regulators of this type are not adversely affected by frequency variations within reasonably wide limits. However, it has been a problem heretofore to provide feedback signals to control saturation level without resort to electronic means which detract from the ruggedness and reliability of the unit. Also, the unit is made more complicated and expensive to manufacture when electronic circuitry is included.

Another problem with conventional voltage regulators incorporating magnetic amplifiers has been waveform distortion. Because of their non-linear character, saturable core devices introduce harmonic components which may be of greater amplitude than can be tolerated in many applications. For this reason, the field of application for conventional regulator designs has been more limited than it might be otherwise.

It is an object of the present invention, therefore, to provide an improved compound voltage regulator which employs passive circuit elements only.

Another object of the invention is to provide a voltage regulator of the aforementioned character which is adapted to maintain an output voltage stable within very close limits and yet which introduces very little waveform distortion.

A further object is to provide a compact voltage regulator which is adapted to operate under severe environmental conditions.

A still further object is to provide a voltage regulator which makes use of magnetic components that are not complicated to manufacture and capacitive elements that are readily available commercially.

The novel features of the invention together with further objects and advantages will become apparent from the following detailed description of a preferred embodiment and the drawing to which the description refers.

In the drawing the voltage regulator according to the invention is illustrated in schematic form.

With reference now to the drawing it will be observed that the numerals 1, 1' designate the input terminals to which the source 12 of alternating voltage to be regulated is connected, and the numerals 2, 2' designate the output terminals for connection to a load 13. Coupled between the terminals 1 and 2 is a linear reactor 14 having a winding with a tap 14' intermediate its ends. A winding portion of an auto transformer 15 is connected between the tap 14' and terminal 1', and the ends of the autotransformer winding are coupled to load windings 16 and 17 of a magnetic amplifier whose control winding is designated 18. As shown, the load windings are disposed in parallel with one another and there are provided diodes 21 and 22 in series with the respective load windings. There is also connected to the ends of the autotransformer winding a capacitor 23 and choke 24 which are disposed in series with one another.

A feedback voltage for the control winding 18 is derived from a voltage doubling rectifier circuit including diode rectifiers 26—29. Diodes 26, 27 have their respective positive and negative electrodes coupled to one end of a transformer secondary winding and diodes 28, 29 have their respective negative and positive electrodes coupled to the opposite end of the winding. The primary winding of the transformer, which is designated 31 in the drawing, is connected across the output terminals 2, 2' while the negative electrodes of diodes 26, 27 are connected to one winding end of a choke 32. To complete the circuit, a voltage dividing circuit including a Zener diode 33 and a potentiometer 34 are connected between the other winding end of choke 32 and the positive electrodes of diodes 28, 29. The movable contact 34' of the potentiometer is connected to one end of the control winding 18 and the secondary winding of transformer 31 has a center tap 31' which is connected to the other end of the control winding.

In operation, when the load on the source is at a maximum, that is under full rated load conditions, the inductance of the load windings is at a maximum to make the net current drawn from tap 14' more capacitive. The capacitor-choke combination 23, 24 resonates above the operating frequency. This series resonance establishes a low impedance path wherein distortion occasioned by the non-linear impedance characteristic of the load windings is strongly attenuated by the addition of the choke. The function of the autotransformer, on the other hand, is to increase the impedance level of the circuit to permit a capacitor 23 of correspondingly reduced current rating and increased voltage rating to be used. In this way, it is possible to realize a substantial reduction in the size of the capacitor for a given load rating.

When the load on the source decreases, or when the source voltage increases, there will be a tendency for the load voltage to rise. As the direct voltage developed across the voltage dividing circuit comprising the Zener diode and the potentiometer is proportional to the load voltage, and as the voltage across the Zener diode itself remains relatively constant, it follows that the voltage difference between the movable contact of the potentiometer and the center tap of the transformer, tends to increase as well. More specifically, the Zener diode is adapted to provide a constant reference voltage, transformer 31 serves to provide a secondary voltage within the operating region of the Zener diode, and the rectifier circuit including diodes 26—29 serves to provide a direct voltage approximately equal to twice the average value of the full wave rectified secondary voltage. This accentuates the dependence of the aforementioned difference voltage upon the value of the load voltage. In the case under consideration, the polarity of the difference voltage is such that less magnetizing current is caused to flow in the control winding which decreases the saturation level of the load windings. As the control winding is seen to be oppositely coupled to the respective load windings, their impedance decreases correspondingly. Consequently, the impedance of the entire magnetic amplifier circuitry decreases with the result that an increased amount of inductive current is drawn from tap 14'. This increases the voltage drop across a portion of the linear reactor winding and thus compensates for the increase in load voltage which would have occurred otherwise due to the initial decrease in the magnitude of the load which was postulated initially. As will by now be apparent, an increase in the load or a decrease in the source voltage tends to increase the amount of feedback voltage applied to the control winding, thereby raising the saturation level of the load windings and effectively increasing their inductive impedance as well as the inductive impedance level of the magnetic amplifier circuit as a whole. This causes less inductive current to be drawn from tap 14' and correspondingly reduces the voltage drop across the source portion of the linear reactor winding in order to compensate for the change. With a source voltage of a 115 volts ±15 percent at a frequency of from 50 to 60 cycles, it has been found that the regulator is capable of providing a regulated voltage to the load whose maximum deviation from the nominal 115 volt value is only ±½%. At no load the amount of harmonic distortion introduced by the regulator is less than 4% and at full load it is substantially less.

The function of the reactor winding portion through which only the load current passes is to compensate for fluctuations in the load or source voltage of very short duration. Those skilled in the art will recognize, however, that this is not an essential feature of the voltage regulator according to the invention and that such a reactor can be replaced by an untapped unit, where short term stability is not so important. Similarly, a different form of voltage reference can be used or indeed the substitution of an entirely different form of rectifier circuit is possible. Therefore, the invention should not be deemed to be limited to the details of what has been described herein by way of illustration, but rather it should be demed to be limited only to the scope of the appended claims.

What is claimed is:

1. Apparatus for regulating the output voltage from an alternating current source to obtain an input voltage to a load of relaively constant magnitude, said apparatus comprising a first inductive element disposed in series between the source and the load, a magnetic amplifier having a pair of load windings and a control winding oppositely coupled to the respective load windings, a capacitor, said capacitor and said load windings being connected in parallel relation to one another to form a parallel resonant circuit, a second inductive element disposed in series with said capacitor, first and second unidirectionally conductive elements disposed in series with the respective load windings, means to couple the resonant circuit across the load, and means to apply to said control winding a direct voltage which is a predetermined function of the input voltage to the load.

2. Apparatus for regulating the output voltage from an alternating current source to obtain an input voltage to a load of relatively constant magnitude, said apparatus comprising an inductive element disposed in series between the source and the load, a magnetic amplifier having a pair of load windings and a control winding oppositely coupled to the respective load windings, a capacitor, said capacitor and said load windings being connected in parallel relation to one another to form a parallel resonant circuit, a linear reactor disposed in series with said capacitor, first and second unidirectionally conductive elements disposed in series with the respective load windings, an auto transformer having an input circuit coupled across the load and an output circuit coupled to said resonant circuit, and means to apply to said control winding a direct voltage which is a predetermined function of the input voltage to the load.

3. Apparatus for regulating the output voltage from an alternating current source to obtain an input voltage to a load of relatively constant magnitude, said apparatus comprising a linear reactor having a magnetic core and a winding on said core connected in series between the source and the load, a magnetic amplifier having a pair of load windings and a control winding oppositely coupled to the respective load windings, a capacitor, said capacitor and said load windings being connected in parallel relation to one another to form a parallel resonant circuit, an inductive element disposed in series with said capacitor, first and second unidirectionally conductive elements disposed in series with the respective load windings, means to couple said circuit across the load and a portion of said reactor winding, and means to apply to said control winding a direct voltage which is a predetermined function of the input voltage to the load.

4. Apparatus for regulating the output voltage from an alternating current source to obtain an input voltage to a load of relatively constant magnitude, said apparatus comprising a magnetic amplifier having a pair of load windings and a control winding oppositely coupled to the respective load windings, a capacitor, said capacitor and said load windings being connected in parallel relation to one another to form a parallel resonant circuit, a second inductive elements disposed in series with said capacitor, first and second unidirectionally conductive elements disposed in series wtih the respective load windings, a first transformer having an input circuit coupled across the load and a portion of said reactor winding and an output circuit coupled to said resonant circuit, a second transformer having a primary winding connected directly across said load and a secondary winding with a center tap, a voltage doubling rectifier having an input circuit coupled to the secondary winding of said second transformer and an output circuit, a voltage reference element and a potentiometer connected in series across the output circuit of said rectifier, said potentiometer having a movable contact and said magnetic amplifier control winding being coupled between said movable contact and said secondary winding center tap.

References Cited in the file of this patent

UNITED STATES PATENTS

| | | |
|---|---|---|
| 2,358,394 | Haug | Sept. 19, 1944 |
| 2,709,779 | Bixby | May 31, 1955 |